United States Patent [19]

Hönlinger

[11] 4,055,081
[45] Oct. 25, 1977

[54] METHOD AND APPARATUS FOR IMPROVING THE RIDE CHARACTERISTICS OF MOTOR VEHICLE WHEELS

[75] Inventor: Herwig Hönlinger, Jugenheim an der Bergstrasse, Germany

[73] Assignee: Gebr. Hofmann KG, Maschinenfabrik, Darmstadt, Germany

[21] Appl. No.: 771,690

[22] Filed: Feb. 24, 1977

[30] Foreign Application Priority Data

Apr. 6, 1976  Germany .............................. 2614852

[51] Int. Cl.² ........................................... G01M 17/02
[52] U.S. Cl. ................................................... 73/146
[58] Field of Search ...................... 73/146, 66; 157/1.1

[56] References Cited

U.S. PATENT DOCUMENTS 3,698,233  10/1972  Braden et al. ........................... 73/146

Primary Examiner—Donald O. Woodiel
Attorney, Agent, or Firm—Cushman, Darby & Cushman

[57] ABSTRACT

A method and apparatus for measuring forces of reaction of a wheel rim and tire so as to minimize smooth road vibrations whereby the wheel and rim are rotated together in a first measuring run, the wheel and rim are rotated with respect to each other by a predetermined angle, and the wheel and rim are rotated together in a second run. The offset angle which minimizes vibrations can then be determined from the reaction forces of the two runs and the wheel and rim rotated with respect to each other to that offset angle.

6 Claims, 4 Drawing Figures

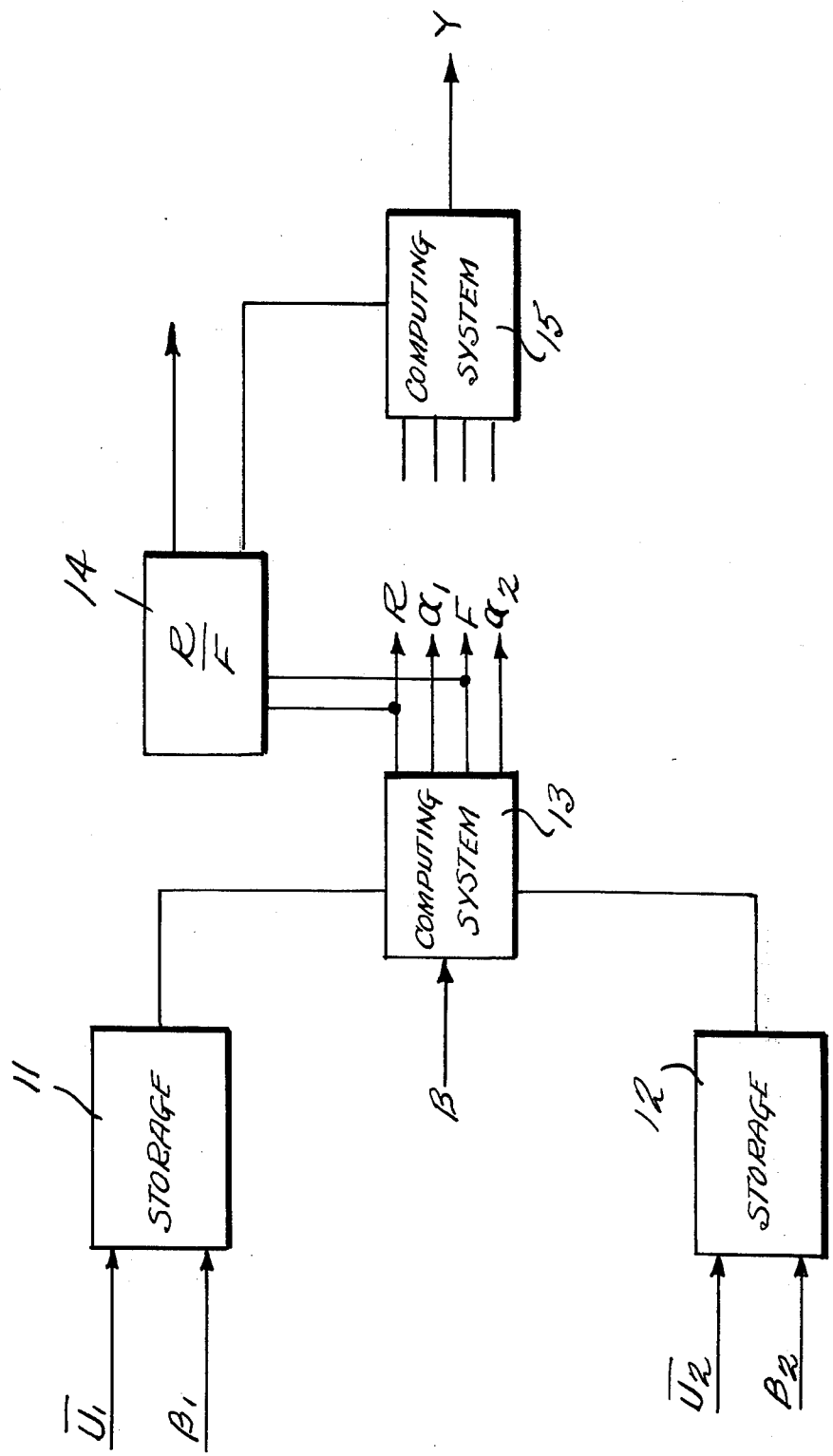

METHOD AND APPARATUS FOR IMPROVING THE RIDE CHARACTERISTICS OF MOTOR VEHICLE WHEELS

This invention relates to a method for reducing the smooth road vibrations of motor vehicle wheels in which the tire and wheel assembly are measured and the tire and the wheel are rotated with respect to each other to match them as much as possible. The present invention also relates to an apparatus for carrying out this method and includes support means for the motor vehicle wheel and a measuring system.

An article in the technical journal "Werkstatt und Betrieb" volume 3/70 points out the effects of the radial and lateral runouts of tires and wheels of motor vehicle wheels. It also describes measuring systems for the determination of these runouts which mark the respective high and low points of the tire and the wheel runout on the respective circumferences, followed by positioning the tire on the wheel such that the low point of the tire and the high point of the wheel are adjacent.

These known methods measure the tire and the wheel separately. The tire and the wheel have to be stored separately and the amplitude and angular location of the respective nonuniformity have to be retained until the tire and the wheel are brought into correct correlation which, however, may result in difficulties. Besides, these known methods detect only the dimensional radial runout of the tire which in itself cannot provide a sufficient criterion for the ride characteristics of the tire.

Moreover, the German printed publication of the unexamined patent specification No. 23 33 057 makes known a method and apparatus for reducing the radial and/or lateral runout of motor vehicle wheels. This method however gives consideration only to the physical dimensions of the chucked wheel. As soon as certain tolerance limits are exceeded, the sides of the tire mounted on the wheel are compressed and cause the beads to disengage from the rim lips and the air to escape. The wheel and the deflated tire can then be rotated with respect to each other.

By this known method, the tire is, however, rotated 180° with respect to the wheel irrespective of the actual angular position of the radial runout of the tire and the wheel, respectively, assuming that an improvement can be obtained for 90% of the wheels with an inadmissible tolerance. This method can yield, however, no defined improvement of the ride characteristics of the motor vehicle wheel. In addition, this known method uses only the physical dimensions of the wheel for the evaluation and correction.

From "Automobiltechnische Zeitschrift" volume 1 of January, 1971, it is also known to associate the tire and the wheel either according to the dimensional runouts or to bring the dynamic force variations of the tire in a given position with respect to the dimensional runout.

The known methods and apparatuses disregard completely that the influence of the dimensional variation of the rim on the sensitivity of the wheel to road vibrations is critically a function of the resilience of the tire mounted on the wheel. Separate measuring of the tire and the wheel can, therefore, give only an indication of the angular location but not of the amplitude of the variation. This means that the above-mentioned method referred to as "matching" for a defined reduction of the smooth road vibration of the motor vehicle wheel by which the tire and wheel assembly is measured, could formerly not be conducted.

It is, therefore, an object of the present invention to provide a method and an apparatus for reducing smooth road vibrations of motor vehicle wheels whereby the tire and the wheel are measured in assembled condition and an improvement of the ride characteristics is to be obtained by so-called "matching" which renders possible a defined improvement of the ride characteristics of the motor vehicle wheel, that is to say, a rather precise determination of the forces of reaction as to amplitude and position which originate in the rim and tire mount thereon.

According to the present invention, this objective is achieved by the method referred to above in that the resultant force of reaction is measured in each of two measuring runs as to amplitude and angular location in connection with which the tire is rotated an offset angle with respect to the rim before the second measuring run and the new resultant force of reaction as to amplitude and angluar position is determined during the second measuring run and the respective forces of reaction both of the rim and the tire as to amplitude and angular location are calculated from the measurements of both runs by taking into consideration the offset angle.

According to the present invention, the forces of reaction of the motor vehicle wheel comprising a tire and rim assembly are ascertained during a first measuring run followed by a second measuring run for which, however, the tire and the rim are rotated against each other a certain degre angle. A measuring device of any known type can be used for taking the measurements. As the present invention permits to obtain precise data of the force of reaction as to amplitude and angluar position of both the rim and the tire, a defined orientation of the tire with respect to the rim in relation to the measurements obtained can be realized.

The first harmonic oscillation is preferably adopted as criterion for the evaluation as a coordination according to the so-called peak-to-peak values will provide no sufficient matching. While also the first harmonic oscillation alone is not the cause of smooth road vibration of the wheel, experience has shown that it has the greatest influence on it.

According to the present invention, this problem is solved by the apparatus referred to above in that a device for rotating the tire and the rim against one another is arranged in the area of the support means and the measuring device includes pick-ups to detect the force of reaction as to amplitude and angular location resulting from the forces of reaction of both the rim and the tire which are connected to a computing system as well as the rotating device for the input of the offset angle.

The computing system serves to determine the amplitude and angular location of the respective forces of reaction produced by the tire and the rim from the values as to amplitude and angular position of the forces of reaction and the offset angle obtained during the two measuring runs. Besides, it is an advantage to provide subsequently to the computing system a decision element in order to find out by computation of the quotient from the respective forces associated with the tire and the rim whether a reduction is required and whether such reduction of the smooth road vibration prevents an important improvement of the ride characteristics because of the difference in amplitude between the respective forces.

Another computing system can also be provided to determine the necessary offset angle between the tire and the rim in case a correction seems to be recommendable. For this purpose, an angular location pick-up may be provided which receives the requisite offset angle for the improvement of the ride characteristics and controls a drive motor for rotating adequately the rim support means.

Further, a braking device with shoes for instance can be provided within the limits of the wheel support means to disengage the tire being rotated from the rim edge.

The present invention offers the advantage that by contrast to known methods and apparatuses for reducing smooth road vibrations mainly on the basis of the detected dimensional runouts of the wheel, it can define the dynamic behavior of the assembled motor vehicle wheel where the improvement of the ride characteristics can be realized in relation to the forces of reaction of the tire and the rim which were ascertained separately as to amplitude and angular location. A fast and defined reduction of the smooth road vibrations of the motor vehicle wheel is thus obtained.

The invention will be more clearly understood after reference to the following detailed specification and in conjunction with the drawings of the embodiment of the present invention, wherein:

FIG. 4 is an evaluation circuit for the values obtained by the two measuring runs.

FIG. 3 shows in detail a testing machine for detecting the values during the measuring runs; however, this machine will also perform the rotations of the tire with respect to the rim as necessary for reducing the smooth road vibration.

Figure 1:
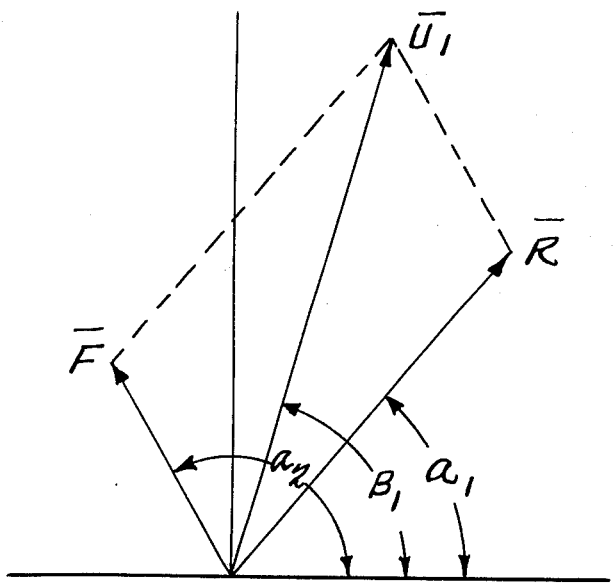
FIG. 1 is a vector diagram showing the forces of an assembled motor vehicle wheel after the first measuring run.

The testing machine comprises essentially support means adapted as a rim chucking device 3 which can be made to rotate by means of a shaft 10 which is carried for instance in ball bearings 16 in known manner from a drive motor 5 through a belt drive 17. A pick-up 6 which can also be of a known construction is provided for the control and interrogation of the angular position of the support means 3 to be referenced by.

The wheel which comprises the tire 1 and the rim 2 in assembled condition, is chucked on the support means 3 by known means and therefore not described in detail herein. A measuring system 4 for the determination of the resultant forces of reaction as to amplitude and angular position includes essentially a test wheel 20 and two force sensors 18 and 19. Test wheel 20 can be rotated from a conventional motor (not shown) and moved against the tire 1 for the measuring run by means of a feeding device. The exemplified embodiment shows the measuring system 4 and the rim support means 3 on a common housing 20.

Within the limits of the rim support means 3 is also provided a braking device comprising shoes 7 and 8 for vertical movement by hydraulic means or the like from a withdrawn position shown in broken lines to a position disengaging the tire 1 from the rim, and more specifically from the rim lip 9, so that the rim rotates by means of the motor 5 with respect to the tire.

In carrying out the first measuring run, the test wheel 20 drives tire 1 under a predetermined load and the forces of reaction are picked up by the sensor units 18 and 19. Before the second measuring run, the tire 1 is disengaged from the rim lip by the braking shoes 7 and 8 and the rim is rotated with respect to the tire by a predetermined angle $\beta$ by the motor 5. The braking shoes 7 and 8 are thereupon moved back into their withdrawn position as shown in broken lines. After inflation of the wheel a second measuring run takes place during which also the forces of reaction are picked up by the sensor units 18 and 19. It is also possible, of course, to rotate the rim with respect to the tire for instance by means of a compressed air bell without the necessity of previously deflating the tire.

Figure 2:
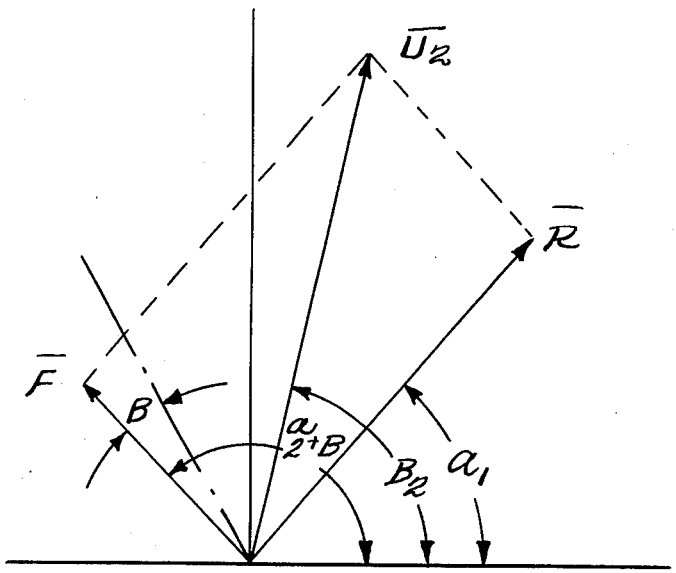
FIG. 2 is a vector diagram showing the forces of an assembled motor vehicle wheel after the second measuring run.
Figure 3:
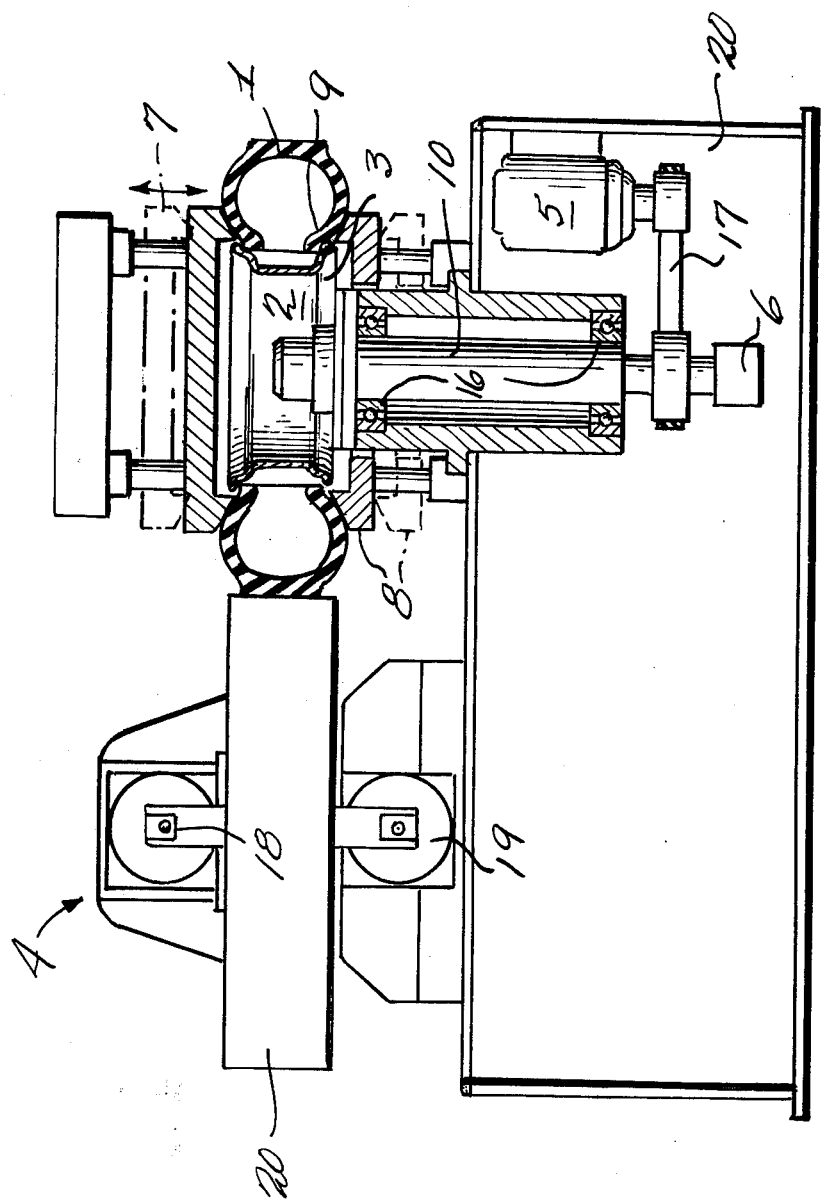
FIG. 3 is an apparatus for determination of the forces obtained by the resultant measuring runs as to amplitude and location.

With reference to FIGS. 1, 2 and 4, the evaluation of the data ascertained by the force sensors 18 and 19 during the two measuring runs and of the offset angle $\beta$ will be described. Assuming the first measuring run yields the resultant force nonuniformity $\overline{U}_1$ of the tire and rim assembly. $\beta_1$ is the phase angle obtained by the measuring system 4 from the force nonuniformity $\overline{U}_1$ resulting from the respective forces of the tire 1 and the rim 2. The resultant force nonuniformity $\overline{U}_1$ is composed of the reaction $\overline{R}$ of the tire having the phase angle $\alpha_1$ and of the force of reaction $\overline{F}$ of the rim having the phase angle $\alpha_2$.

The respective forces $\overline{R}$ and $\overline{F}$ of the tire and the rim interact as there is interaction between the nonuniformity of the rim being its dimensional radial runout, and the spring rate of the tire in such a way that the dimensional radial runout of the rim is multiplied by the spring rate of the tire. The known methods and apparatuses for improving the ride characteristics of the motor vehicle wheel do not take into account these interactions. The present invention eliminates this disadvantage as the actual effects of the nonuniformities of the rim and the tire on the smooth road vibrations of the wheel are measured and considered in its reduction. This is attained by measuring the tire and the rim as an assembly or in other words in the condition in which the wheel is used whereupon the appropriate improvement of the wheel ride characteristics is accomplished.

In order to be able to determine the respective forces of reaction of the tire and the rim as to amplitude and angular position, four unknown quantities must be detected in the measuring runs, namely, the magnitude of the respective forces of reaction $\overline{R}$, $\overline{F}$ and their angular locations $\alpha_1$ and $\alpha_2$. However, only the following two equations containing these unknown quantities can be derived from the first measuring run:

$$\overline{U}_1 \cdot \sin \beta_1 = \overline{R} \cdot \sin \alpha_1 + \overline{F} \cdot \sin \alpha_2$$

$$\overline{U}_1 \cdot \cos \beta_1 = \overline{R} \cdot \cos \alpha_1 + \overline{F} \cdot \cos \alpha_2$$

The quantities $\overline{U}_1$ and $\alpha_1$ appear as measured values in the equations and are, therefore, known. The four unknown values, however, cannot yet be determined from these two equations alone. This difficulty is overcome by carrying out a second measuring run for which the rim 2 and the tire 1 are, however, rotated against one another by a predetermined angle $\beta$ of any degree. The result is another two measured values as will also be noted from FIG. 2, namely, the resultant force nonuniformity $\bar{U}_2$ with the angular position $\beta_2$, whereby the additional two equations are as follows:

$$\bar{U}_2 \cdot \sin \beta_2 = \bar{R} \cdot \sin \beta_1 + \bar{F} \cdot \sin (\alpha_1 + \beta)$$

$$\bar{U}_2 \cdot \cos \beta_2 = \bar{R} \cdot \cos \beta_1 + \bar{F} \cdot \cos (\alpha_1 + \beta)$$

Four equations are thus available for the four unknown quantities and can be solved mathematically for instance by a conventional computing system shown in FIG. 4.

The value $\bar{U}_1$ and the angular postion $\beta_1$ of the force of reaction resulting from the respective forces of reaction of the rim and of the tire as detected during the first measuring run, are applied to a storage 11 and the measured values $\bar{U}_2$ and $\beta_2$ of the force of reaction yielded by the second measuring run, are introduced into a storage 12 from which the measured values and the offset angle $\beta$ by which the tire has been rotated with respect to the rim before the second measuring run, are applied to a computing system 13. This computing system serves to solve the four equations mentioned hereinbefore, and to determine the unknown values $\bar{R}$, $\bar{F}$ and $\alpha_1$, $\alpha_2$.

While the evaluation and determination of the values obtained during the first and second measuring runs in the storages 11 and 12 can occur for instance in accordance with the former German Patent Application No. P 25 36 332, other known methods can also be used.

A decision element 14 is provided at the output of the computing system 13 for determining the quotient R/F from which can be noted whether a correction is necessary or whether such a correction prevents an important reduction of the smooth road vibrations because of the difference in amplitude between R and F. An improvement of the ride characteristics may be omitted in the event that one force of reaction is significantly much greater than the other force of reaction.

Moreover, a second computing system 15 is provided which is started of an improvement of the ride characteristics of the measured wheel seems to be advisable. This second computing system ascertains thereupon the necessary offset angle $\gamma$ between the tire 1 and the rim 2 and relays this angle $\gamma$ to an angular position pick-up 6 which controls the motor 5 such that it rotates the rim adequately without the tire 1 being disengaged from the rim edge 9. The optimum angle $\gamma$ is normally the angle between $\bar{R}$ and $\bar{F}$.

If this improvement does not seem recommendable, the wheel is moved straight out of the measuring station and another wheel to be tested is mounted in the support means 3. Apparently, the optimum of reducing smooth road vibrations of the wheel is reached when $\bar{R}$ and $\bar{F}$ after the reduction are in opposite directions which can be realized by the defined rotation of the tire and/or rim. It is obviously possible also to rotate the tire 1 in the place of the rim 2 when the latter is fixed.

Moreover, it is another advantage of the present invention that the reduction of smooth road vibrations and the setting of the offset angle $\beta$ for the second measuring run can be performed by one and the same apparatus.

Many changes and modifications in the above described embodiments can, of course, be carried out without departing from the scope of the invention. That scope, accordingly, is intended to be limmited only by the scope of the appended claims.

What is claimed is:

1. A method for reducing the smooth road vibrations of motor vehicles having a wheel rim and a tire mounted on said rim, comprising the steps of:
   rotating the rim and tire in a first measuring run;
   measuring the amplitude and angle of the first forces of reaction of the rim and tire produced during said first run;
   rotating the rim and tire with respect to each other by a predetermined angle;
   rotating the rim and tire in a second measuring run;
   measuring the amplitude and angle of the second forces of reaction of the rim and tire produced during said second run;
   at least when the vibrations can be corrected by more than a predetermined amount, calculating the offset angle between tire and rim to reduce vibrations from said measured first and second forces; and
   rotating said rim and tire with respect to each other to said offset angle.

2. A method as in claim 1, wherein each of said steps of measuring includes measuring the first harmonic oscillation of the resultant force of reaction.

3. An apparatus for measuring forces of reaction of a wheel rim and a tire having treads mounted thereon comprising:
   a frame;
   means mounted on said frame for mounting said rim and tire for rotation;
   means mounted on said frame for rotating said wheel and rim together;
   means mounted on said frame for engaging said thread during rotation and for measuring the angle and amplitude of the forces of reaction of the rim and tire produced;
   means mounted on said frame for engaging said tire to prevent rotation of the same so that operating said rotating means causes relative rotation between said tire and rim;
   computing means connected to said engaging and measuring means for producing a signal from the reaction forces produced during first and second measuring runs of said wheel and rim at different offset angles for determining an offset angle between rim and wheel to reduce vibrations; and
   means for causing rotation of said rim and wheel with respect to each other to said offset angle.

4. Apparatus as in claim 3, wherein said computing means includes means connected to said engaging and measuring means for calculating the force of reaction R of the tire and the force of reaction F of the rim, means for determining the quotient R/F, and means for computing from said quotient said offset angle.

5. Apparatus as in claim 4, wherein said computing means further includes first storage means connected to said calculating means for storing the forces of reaction of the tire and rim produced during said first run and second storage means connected to said calculating means for storing the forces of reaction of the tire and rim during said second run.

6. Apparatus as in claim 5 wherein said time engaging means includes clamping means movable along the axis of the rotation to engage and disengage said tire.

* * * * *